United States Patent
Huang et al.

(10) Patent No.: US 9,116,854 B2
(45) Date of Patent: Aug. 25, 2015

(54) METHOD OF EVALUATING IMAGE CORRELATION WITH SPECKLE PATTER

(71) Applicant: National Applied Research Laboratories, Taipei (TW)

(72) Inventors: Chi-Hung Huang, Hsinchu (TW); Wei-Chung Wang, Hsinchu (TW); Yung-Hsiang Chen, Hsinchu (TW); Tzi-Hung Chung, Hsinchu (TW); Tai-Shan Liao, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 51 days.

(21) Appl. No.: 14/044,041

(22) Filed: Oct. 2, 2013

(65) Prior Publication Data

US 2015/0093043 A1    Apr. 2, 2015

(51) Int. Cl.
*G06F 17/15* (2006.01)
*G06T 7/00* (2006.01)

(52) U.S. Cl.
CPC ............. *G06F 17/156* (2013.01); *G06T 7/00* (2013.01); *G06T 2207/20048* (2013.01)

(58) Field of Classification Search
CPC .............. H04N 1/047; H04N 1/107; H04N 2201/02439; H04N 2201/0471; H04N 2201/04729; H04N 2201/04731; H04N 2201/04734; H04N 2201/04737; H04N 2201/04789; H04N 2201/04791; H04N 2201/04794; G01N 15/1434; G01N 21/532; G01N 2021/479; G01N 2021/4792; G01B 9/02082; G01B 9/02087; G02B 27/48
See application file for complete search history.

(56) References Cited

U.S. PATENT DOCUMENTS

| | | | | |
|---|---|---|---|---|
| 7,295,324 B2 * | 11/2007 | Jones et al. | .................... | 356/498 |
| 7,315,372 B1 * | 1/2008 | Billard et al. | ................. | 356/338 |
| 7,567,349 B2 * | 7/2009 | Tearney et al. | ............... | 356/479 |

* cited by examiner

*Primary Examiner* — Jose Couso
(74) *Attorney, Agent, or Firm* — Chih Feng Yeh; Huntington IP Consulting Co., Ltd.

(57) ABSTRACT

An image correlation for images having speckle pattern is evaluated. Modulation transfer function (MTF) curves of speckle-pattern images captured at different times are figured out. Whether a correlation value between the MTF curves meets a threshold is checked. If the correlation value is smaller than the threshold, speckle-pattern images are re-selected for re-figuring out the MTF curves and the correlation value. Thus, error of strain and displacement for digital image correlation owing to blurring images of the on-moving target object is figured out; calculation time of the digital image correlation is reduced; and accuracy on measuring physical parameters of the target object before and after movement is improved for digital image correlation.

17 Claims, 10 Drawing Sheets

METHOD OF EVALUATING IMAGE CORRELATION WITH SPECKLE PATTER

TECHNICAL FIELD OF THE INVENTION

The present invention relates to evaluating image correlation; more particularly, relates to transforming speckle-pattern images to figure out the correlation quality between the speckle-pattern images for updating the speckle-pattern images.

DESCRIPTION OF THE RELATED ART

Digital image correlation method is based on the determination of the corresponding image-pixels locations of two different images by performing correlation operation of two digital images. Natural or artificial speckle pattern on surface of a target object is usually used. Image taken at the status before the target object subjected to additional external force is defined as the first speckle-pattern image. After the target object changes its position, angle or figure owing to the external force, image-capturing devices are used to capture images of the target object and the captured images are called as the second speckle-pattern images. The digital image correlation method evaluates the position, angle or figure change by figuring out the most-likely area among images; that is, the most-likely area is defined as a specified small-image-area of the first speckle-pattern image and small-image-area of the second speckle-pattern image have extreme correlation value.

In real application, the sub-images of specific sub-areas of the target object in the images captured at different times are then defined. Then, the correlation of the defined specific sub-images of the sub-areas of the target object at two different times is figured out. Repeating, all corresponding locations of the sub-images of the sub-areas are determined; the displacement, deformation and strain of the target object can be evaluated from the calculated sub-images geometrical relations.

On using the digital image correlation method, at least two images have to be captured at different times and transformed into digital images to be stored in a computer.

On processing digital image correlation analysis, an observation area is selected from an image captured at the first time and a size of a sub-image for analysis is selected too. Then, a point in the sub-image is selected as a center point of an N×N sub-image. Digital image correlation obtains by calculating the cross-correlation values of the whole corresponding sub-images captured at different times. When the target object moves, the captured images may become blurred because of the target object moves out of the depth of field of the imaging lens of the image recording device. At the moment, the speckle pattern on the recorded image is blurred and the recorded image characteristics of the speckle pattern, spatial frequency distribution, might be changed.

Hence, not only required time for image calculation is prolonged, but also on the calculated displacement, deformation and strain of the target object may be wrong. Therefore, the images have to be retreated to sharpen the speckle pattern; error on comparison has to be solved; and, as a result, correlation between images has to be improved.

Traditional digital image correlation method assumes that the images of the target object are captured at different times yet within the same depth of field and of the images of the speckle have the same spatial frequency distribution. However, it is quite often that images captured at different times are not applicable. It is because the images are not captured within the same depth of field or do not of the same speckle-pattern spatial frequency distribution.

As mentioned above, traditional digital image correlation method faces problems on depth of field and spatial frequency distribution of speckle-pattern and often finds error on measuring displacement, deformation and strain of a target object. Hence, the prior art does not fulfill all users' requests on actual use.

SUMMARY OF THE INVENTION

The main purpose of the present invention is to transform speckle-pattern images into spatial-frequency depended parameter to evaluate the image correlation quality between the speckle-pattern images for updating the speckle-pattern images.

To achieve the above purpose, the present invention is a method of evaluating image correlation with speckle-pattern, comprising steps of (a) capturing a First Speckle-Pattern Image and at least one Second Speckle-Pattern Image of a target object at different times (status), separately; (b) obtaining a first MTF curve of the First Speckle-Pattern Image and obtaining at least one second MTF curve of the at least one Second Speckle-Pattern Image; (c) obtaining a correlation value between the first MTF curve and the at least one second MTF curve; and (d) evaluating the correlation value between the first MTF curve and the at least one second MTF curve until the correlation value meets a threshold. Accordingly, a novel method of evaluating image correlation with speckle pattern is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1A is the structural view showing the first apparatus for the present invention;

DESCRIPTION OF THE PREFERRED EMBODIMENT

Figure 1A:
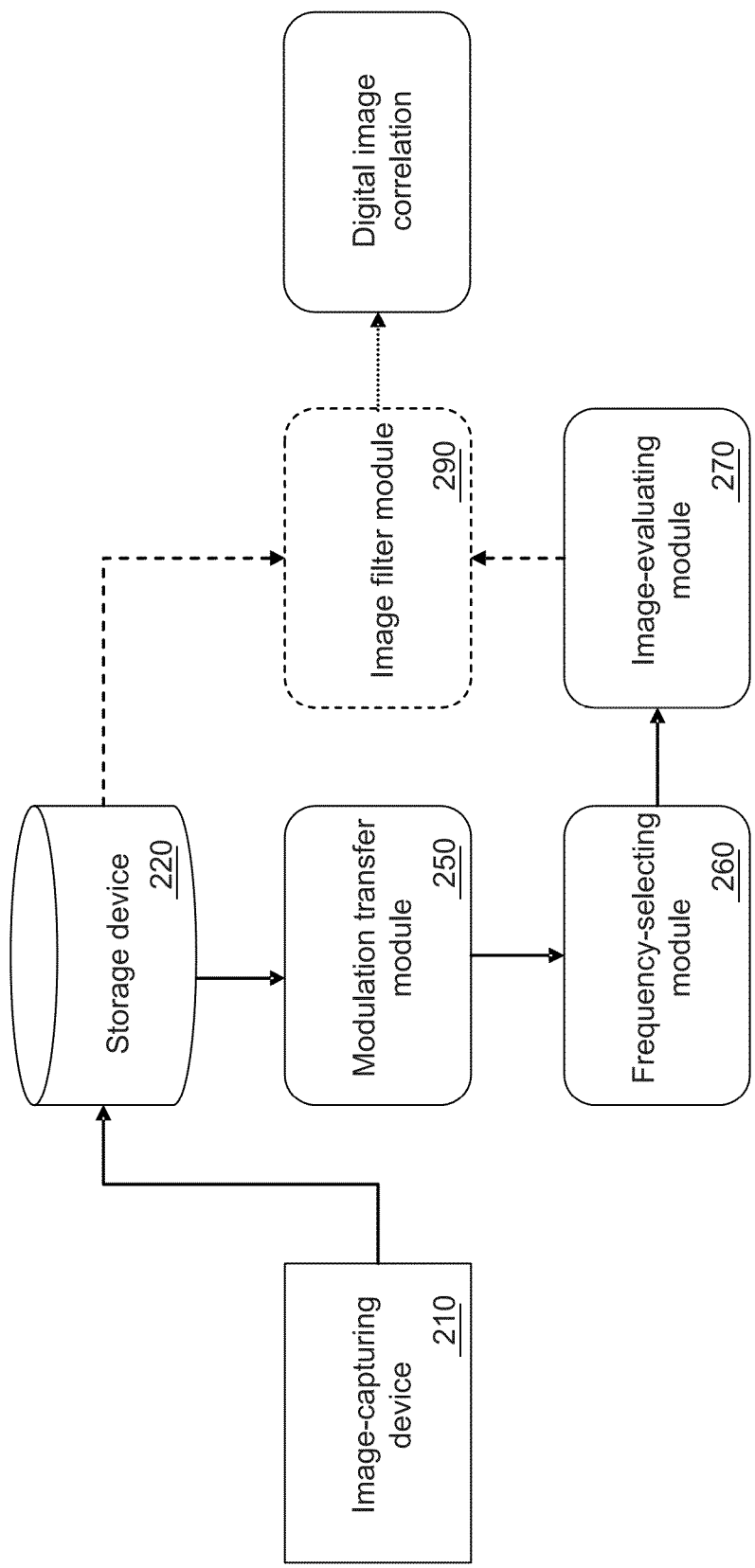
FIG. 1B is the structural view showing the modulation transfer module.
Figure 1B:
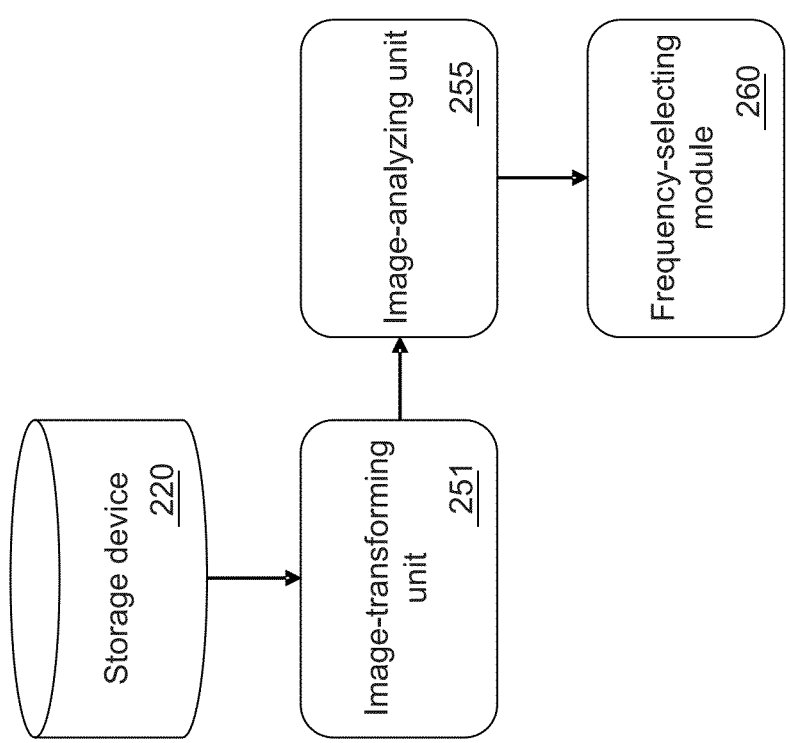

The following description of the preferred embodiment is provided to understand the features and the structures of the present invention.

The present invention uses modulation transfer function (MTF) to evaluate correlation quality between two speckle-pattern images used in digital image correlation for measuring strain and displacement. The other advantage of present invention is used to judge accuracy of the measured strain and displacement and the distribution of error on measured displacement and strain through digital image correlation is determined as well. Therein, digital image correlation relies on the recorded image information of a target object obtained by the image-capturing device. Meaning the displacement or deformation of the target object depends on recorded image resolution. The mean-diameter of the speckle pattern of the target object would be different as the target object is moved to different location within or out of the depth of field of the lens of the image-capturing device, that makes the change of the image resolution of the target object can be detected by the MTF curve calculated from target image with speckle pattern.

The obtained speckle-pattern images are used to figure out MTF, a spatial frequency depending parameter. Thus, before processing the digital image correlation of images, the correlation quality of the speckle-pattern images is judged.

Furthermore, when the image correlation between the speckle-pattern images departs from the extreme value, a spatial frequency range can be chosen to process the speckle-pattern images with coordination of an image filter according to the evaluated MTF curves. Therein, the image filter is a smoothing filter, a low-pass filter, a high-pass filter, a band-pass filter or an image enhancer. The present invention can use a sharpening filter to enhance minute parts or recover blurred parts of the images. Thus, the present invention evaluates the correlation quality between the speckle-pattern images and achieves ideal accuracy on analyzing the digital image correlation between the speckle-pattern images; and, furthermore, errors from blurring images are repaired through the image filter.

Please refer to FIG. 1A to FIG. 5, which are structural views showing a first apparatus and a modulation transfer module for the present invention; views showing a first to a third MTF curves; flow views showing a preferred embodiment, a calculating process of MTF curves and a re-assigning process of speckle-pattern image; and structural views showing a second and a third apparatuses for the present invention. The present invention is a method of evaluating image correlation with speckle pattern. An apparatus for the present invention comprises an image-capturing device 210, a storage device 220, a modulation transfer module 250, a frequency-selecting module 260 and an image-evaluating module 270.

The image-capturing device 210 is a device to capture an image having the target object shown within. The image-capturing device 210 can be a digital camera or a pickup camera.

The image-capturing device 210 captures two or more than two images having speckle pattern or other characteristics. On capturing the images, the distance between the image-capturing device 210 and the target object is subjected to change. In the images captured by the image-capturing device 210, an image captured at a specific time is called "First Speckle-Pattern Image" and the other image(s) is called "Second Speckle-Pattern Image(s)". Therein, the First Speckle-Pattern Image is usually an exactly focusing image and the Second Speckle-Pattern Image is usually a deforming image or a blurring image owing to movement of the target object.

Generally, after the image-capturing device 210 captures an image of the target object at the first time, the image of the target object is captured again periodically. When the image-capturing device 210 captures the images of the target object at different times, the distance between the image-capturing device 210 and the target object can be different. Or, the image-capturing device 210 and the target object can be kept departing from each other for a fixed distance. Therein, the image-capturing device 210 is at first located at a distance to exactly focus on the target object for capturing a clear image; then, within image-capturing duration the target object and image-capturing device 210 gradually approaches/leaves to each other to a distance to blur the image; then, the distance between target object and image-capturing device 210 goes back to the original exactly focusing distance; and, then, target object and image-capturing device 210 gradually leaves/approaches to each other to a distance to blur the image again. Or, the image-capturing device 210 can be at first located at a distance with the image blurred; then, gradually approaches/leaves to a distance to exactly focus on the target object for capturing a clear image; and, then, gradually leaves/approaches to a distance to blur the image again.

The storage device 220 stores the speckle-pattern images captured by the image-capturing device 210.

The modulation transfer module 250 figures out MTF curves according to the speckle-pattern images stored in the storage device 220.

Figure 2A:
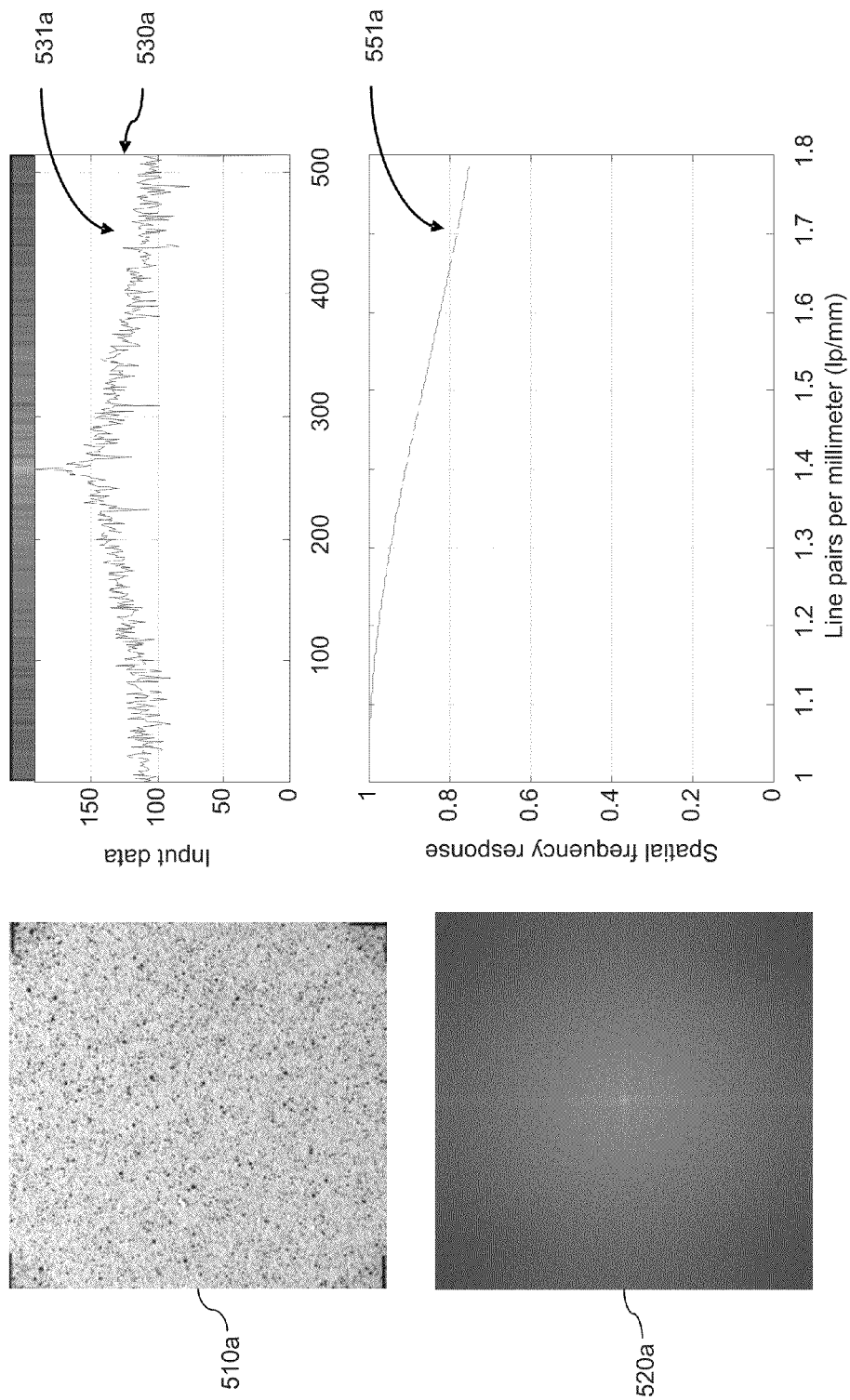
FIG. 2A to FIG. 2C are the views showing the first to the third MTF curves.
Figure 2B:
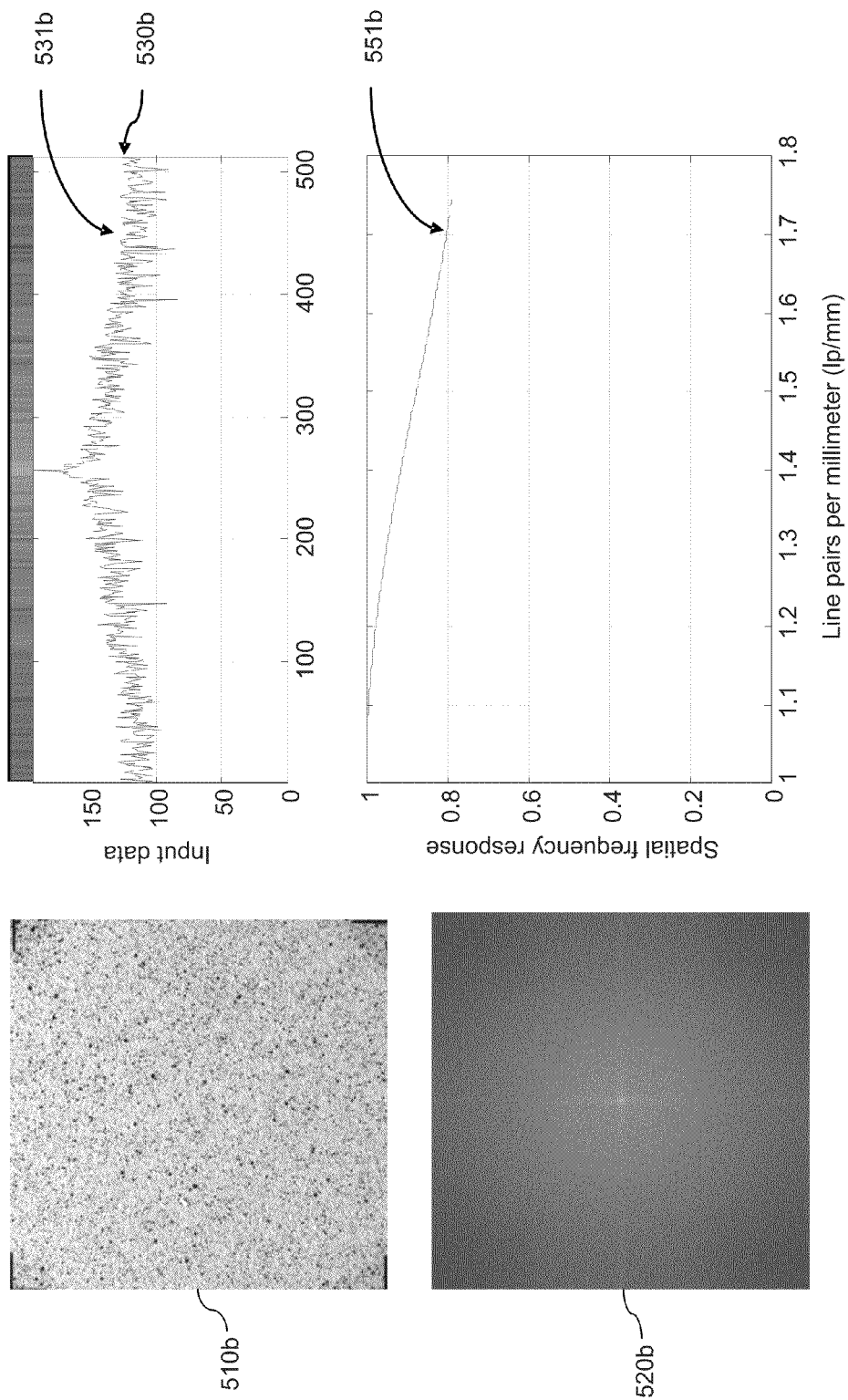
Figure 2C:
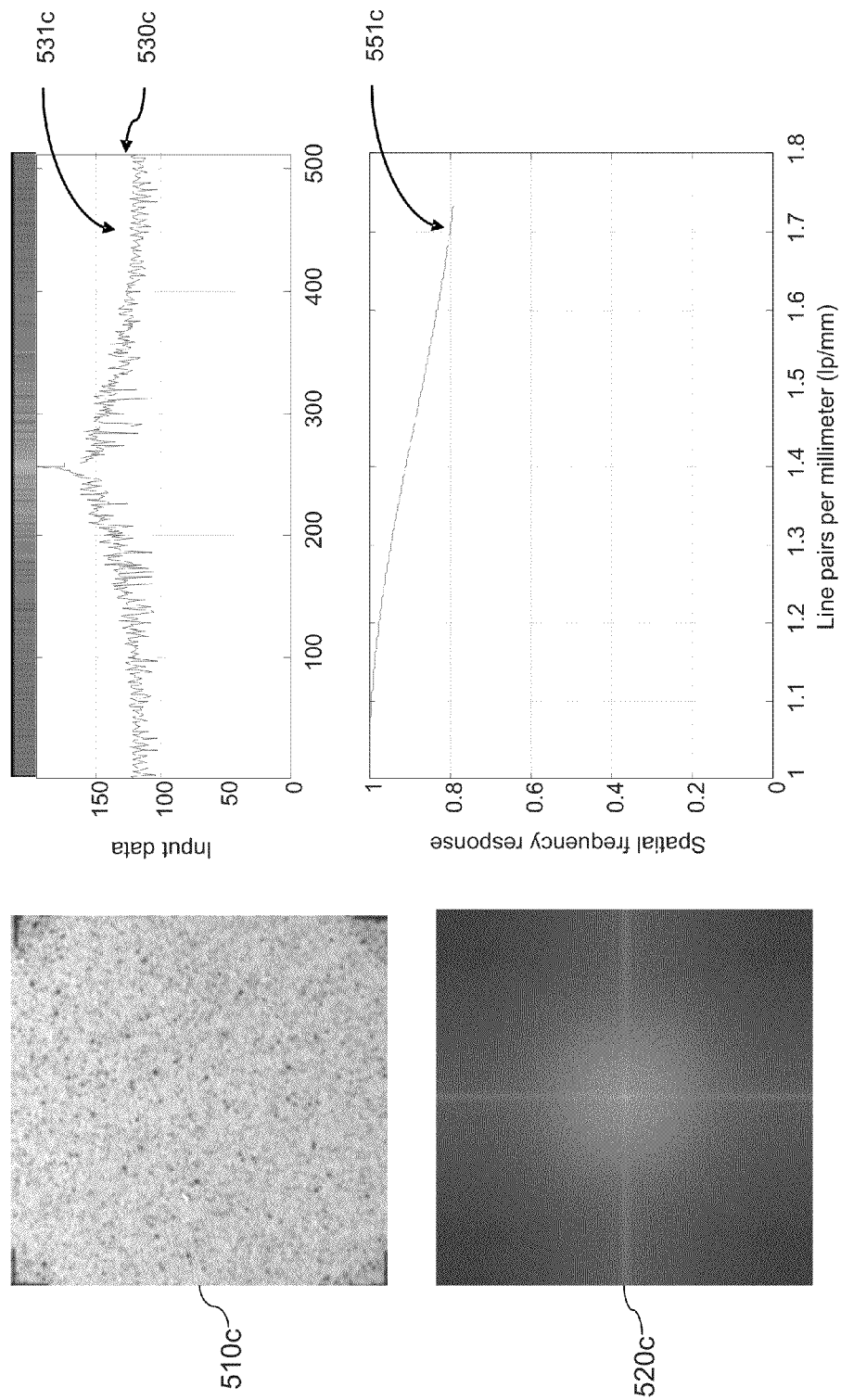

In FIG. 2A, a First Speckle-Pattern Image 510a of the target object is captured by the image-capturing device 210 at a best exactly focusing position (depth of field). In FIG. 2B, a Second Speckle-Pattern Image 510b of the target object is captured after shortening the distance between the target object and the image-capturing device 210 to a certain distance to leave from the best exactly focusing position. In FIG. 2C, another Second Speckle-Pattern Image 510c of the target object is captured after increasing the distance between the target object and the image-capturing device 210 to another certain distance to further leave from the best exactly focusing position. Therein, a first MTF curve 551a shown in FIG. 2A is figured out by the modulation transfer module 250 according to the First Speckle-Pattern Image 510a; a second MTF curve 551b shown in FIG. 2B, according to the Second Speckle-Pattern Image 510b; and, a third MTF curve 551c shown in FIG. 2C, according to the another Second Speckle-Pattern Image 510c.

In the present invention, the modulation transfer module 250 can figure out all of the second MTF curves at once according to the Second Speckle-Pattern Images; or, only when the image-evaluating module 270 finds that the correlation value does not meet the threshold, another second MTF curve is then figured out according to another Second Speckle-Pattern Image stored in the storage device.

In a practical use, the modulation transfer module 250 further comprises an image-transforming unit 251 and an image-analyzing unit 255.

The image-transforming unit 251 transforms the speckle-pattern images into M×N 2-dimensional (2D) matrixes according to brightness of elements in the speckle-pattern image.

The image-transforming unit 251 processes Fourier transformation to the M×N 2D matrix. Generally, the image-transforming unit 251 figures out average value of all elements of the M×N 2D matrix at first. After the average value is figured out, each element in the M×N 2D matrix is deducted with the average value. Then, elements of the M×N 2D matrix are processed through Fourier transformation to figure out transformed values from the M×N 2D matrix for obtaining a gray-scaled image corresponding to the speckle-pattern image.

After transformations are processed to the 2D values of the speckle-pattern image by the image-transforming unit 251, the gray-scaled image, such as 520a, 520b, 520c, is obtained. The gray-scaled image shows image symmetric with respect to the horizontal and vertical directions of an image center.

The image-analyzing unit 255 analyzes the gray-scaled image generated by the image-transforming unit 251 to figure out the MTF curves of the speckle-pattern images. Generally, the image-analyzing unit 255 analyzes the gray-scaled image along a specified line which passes through the origin of the image to obtain a spatial frequency curve for obtaining the MTF curve, the specified line said to be horizontal axis for example. In FIG. 2A to FIG. 2C, the spatial frequency diagram 530a, 530b, 530c shows the spatial frequency curve 531a, 531b, 531c obtained after analyzing the gray-scaled image 520a, 520b, 520c at a horizontal axis of the image by the image-analyzing unit 255 of the modulation transfer module 250; and, the MTF curve 551a, 551b, 551c is figured out by the image-analyzing unit 255 according to the spatial frequency curve 531a, 531b, 531c.

The frequency-selecting module 260 selects the spatial frequency range according to the first MTF curve.

The image-evaluating module 270 figures out a correlation value between the first MTF curve and second MTF curve to evaluate the First Speckle-Pattern Image and the Second Speckle-Pattern Image. Generally, the image-evaluating module 270 uses the spatial frequency range selected by the frequency-selecting module 260 to figure out a difference between the first MTF curve and the second MTF curve. Or, the image-evaluating module 270 directly figures out the difference between the first MTF curve and the second MTF curve.

The difference figured out by the image-evaluating module 270 is in fact the correlation value (R) between the first MTF curve and the second MTF curve. Practically, the correlation value figured out by the image-evaluating module 270 is between 0 and 1 ($0 \leq R \leq 1$).

When the correlation value figured out by the image-evaluating module 270 is greater than or equal to the threshold ($T_{value}$), evaluation of the correlation between the First Speckle-Pattern Image and the Second Speckle-Pattern Image is finished for figuring out the digital image correlation between the Second Speckle-Pattern Image and the First Speckle-Pattern Image. Thus, through figuring out the digital image correlation, physical parameters like displacement field and stress field of the target object are analyzed.

When the correlation value figured out by the image-evaluating module 270 is smaller than the threshold, the physical parameters of the target object can not be properly analyzed after figuring out the digital image correlation between the Second Speckle-Pattern Image and the First Speckle-Pattern Image. Hence, the modulation transfer module 250 has to select another second MTF curve based on another Second Speckle-Pattern Image for figuring out another correlation value between the original first MTF curve and the newly-selected second MTF curve. Or, the newly-selected second MTF curve is re-assigned as a new first MTF curve for figuring out a correlation value between the newly-assigned first MTF curve and the original second MTF curve. This process is continuously progressing until the image-evaluating module 270 has a correlation value greater than the threshold ($T_{value}$) is found or no more speckle-pattern image is available.

Besides, the present invention can further comprise an image filter module 290. The image filter module 290 comprises one or a plurality of image filters. The image filter module 290 can be a smoothing filter, a low-pass filter, a high-pass filter or a band-pass filter to filter noise in the First Speckle-Pattern Image and the Second Speckle-Pattern Image; or, can be a sharpening filter to improve quality of the First Speckle-Pattern Image and the Second Speckle-Pattern Image. Any filter that filters the speckle-pattern images to improve accuracy of the digital image correlation with the filtered speckle-pattern images can be used as the image filter module 290.

Figure 3A:
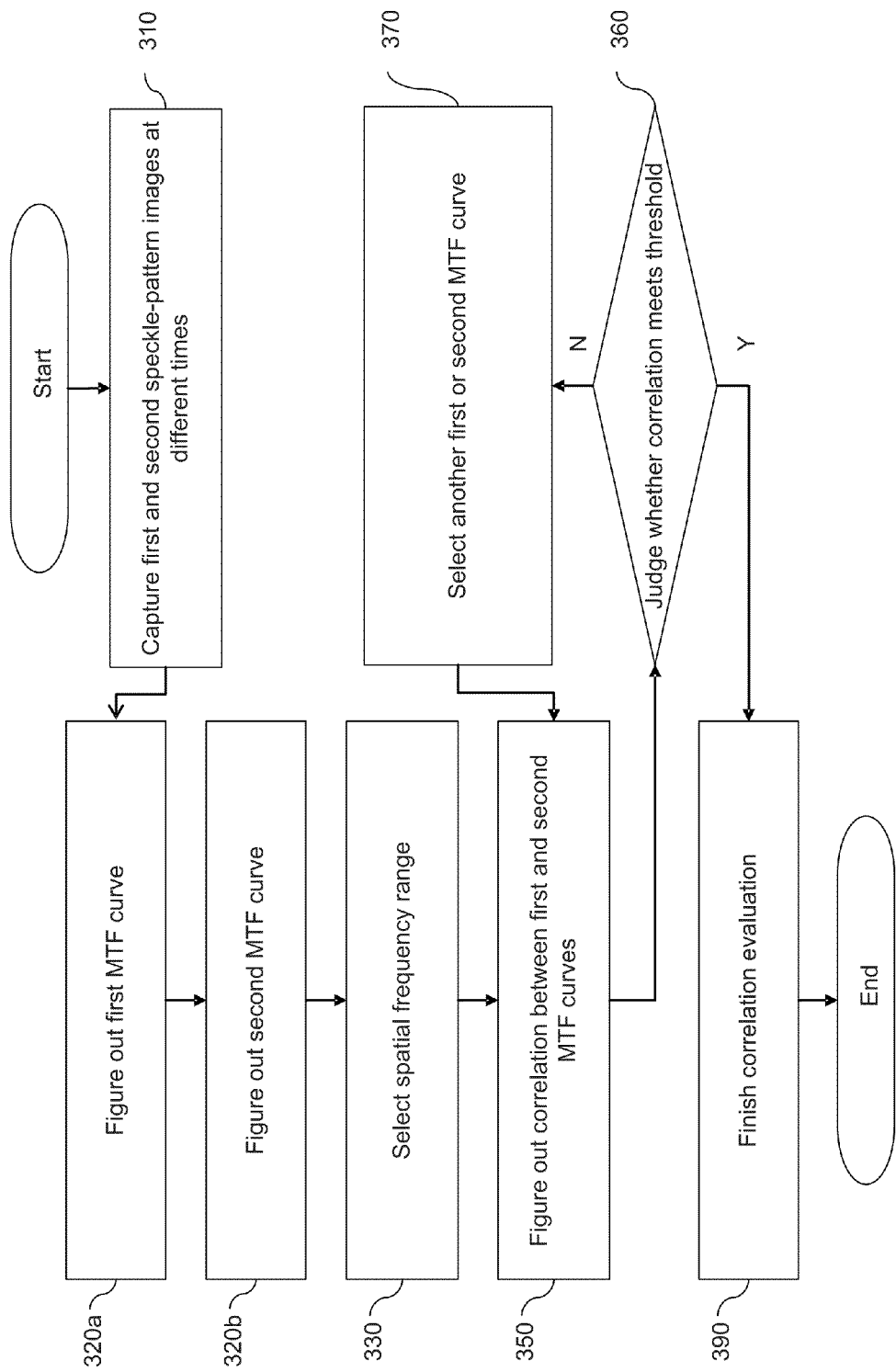
FIG. 3A is the flow view showing the preferred embodiment according to the present invention.

In FIG. 3A, the image-capturing device 210 captures speckle-pattern images of a target object having a speckle pattern. In the speckle-pattern images captured by the image-capturing device 210, a speckle-pattern image captured at a specific time is assigned as a First Speckle-Pattern Image. The other speckle-pattern images captured at any other time are assigned as Second Speckle-Pattern Images (step 310). Then, the image-capturing device 210 stores the First Speckle-Pattern Image and the Second Speckle-Pattern Images in the storage device 220. Therein, the image-capturing device 210 captures the speckle-pattern images with a fixed or non-fixed time of interval. At first, the target object is located at a position where the image-capturing device 210 can captures a clear speckle-pattern image of the target object to be used as a First Speckle-Pattern Image. Then, when the target object acts, moves or deforms, the target object moves toward or away from the image-capturing device 210 and the image-capturing device 210 thus captures a plurality of Second Speckle-Pattern Images. Therein, some Second Speckle-Pattern Images may be over-blurred because the action, motion or deformation is too big to make the distance between the target object and the image-capturing device 210 become too near or too far. Some Second Speckle-Pattern Images may be over-blurred because they are captured during the action, motion or deformation of the target object.

After the image-capturing device 210 captures the First Speckle-Pattern Image and the Second Speckle-Pattern Image (step 310), the modulation transfer module 250 figures out a first MTF curve based on the First Speckle-Pattern Image (step 320a) and second MTF curves based on the Second Speckle-Pattern Images (step 320a).

Figure 3B:
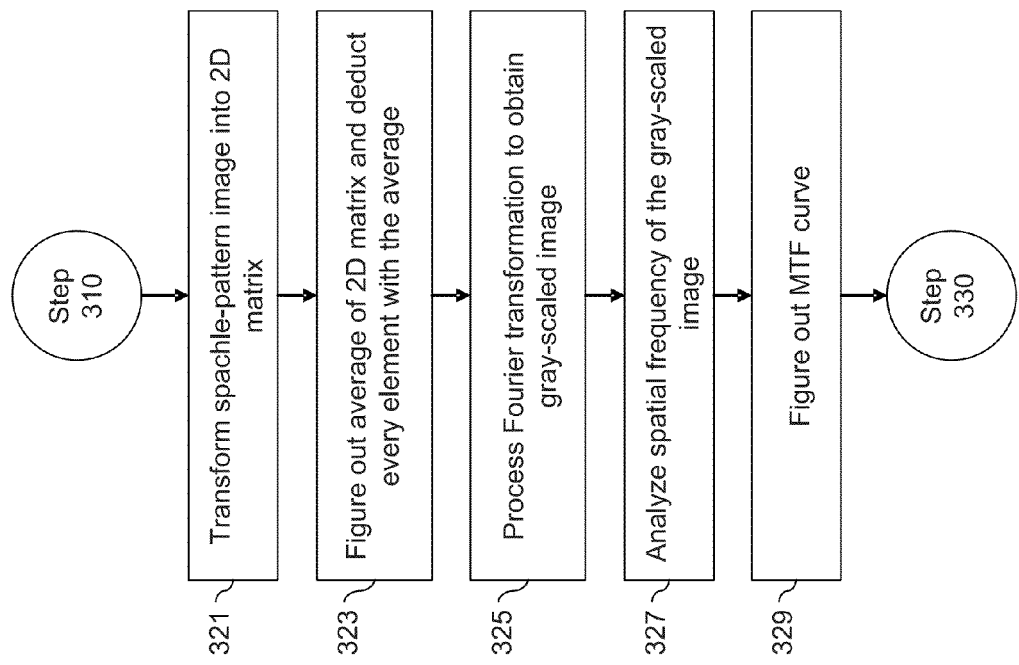
FIG. 3B is the flow view showing the calculating process of the MTF curves.
Figure 3C:
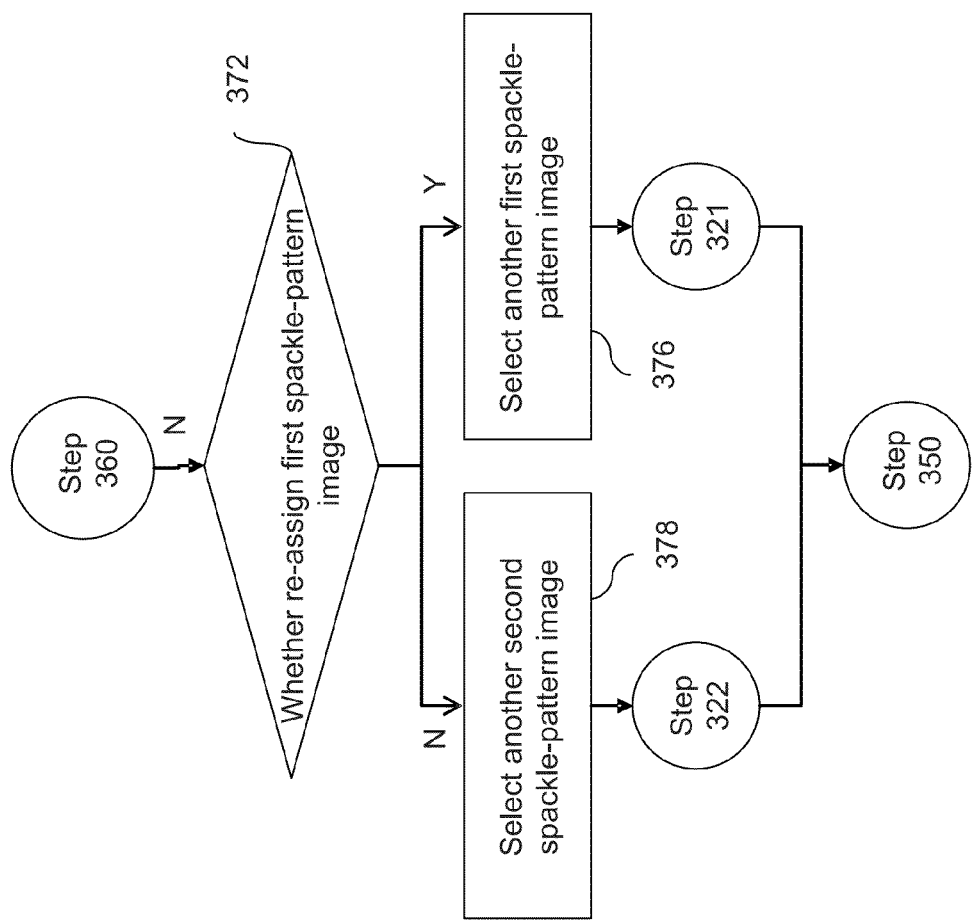
FIG. 3C is the flow view showing the re-assigning process of the speckle-pattern image.

In FIG. 3B, the image-transforming unit 251 in the modulation transfer module 250 transforms each of the speckle-pattern image into a M×N 2D matrix (step 321); and figures out an average value of all elements of each M×N 2D matrix for deducting each element with the average value (step 323). Then, the image-transforming unit 251 processes Fourier transformation to obtain separated gray-scaled image corresponding to each speckle-pattern image (step 325). Then, the image-analyzing unit 255 in the modulation transfer module 250 analyzes a spatial frequency range in the gray-scaled image (step 327) to figure out an MTF curve (step 329).

After the modulation transfer module 250 figures out the first MTF curve of the First Speckle-Pattern Image and the second MTF curve of the Second Speckle-Pattern Image (step 320a,320b), the image-evaluating module 270 figures out a correlation value between the first MTF curve and the second MTF curve (step 350). The image-evaluating module 270 can use a function of correlation calculation to figure out the correlation value between the first MTF curve and the second MTF curve.

After the modulation transfer module 250 respectively figures out the first MTF curve and the second MTF curve based on the First Speckle-Pattern Image and the Second Speckle-Pattern Image (step (step 320a,320b), the frequency-selecting module 260 selects a spatial frequency range based on the first MTF curve (step 330). After the frequency-selecting module 260 selects the spatial frequency range based on the first MTF curve (step 330), the image-evaluating module 270 figures out the correlation value between the first MTF curve and the second MTF curve based the spatial frequency range selected by the frequency-selecting module 260.

After the image-evaluating module 270 figures out the correlation value between the first MTF curve and the second MTF curve (step 350), the image-evaluating module 270 judges whether the correlation value meets a threshold (step 360). Because the modulation transfer module 250 figures out the second MTF curve based on the blurred Second Speckle- Pattern Image, it is possible that the correlation value figured out by the image-evaluating module 270 does not meet the threshold.

When the image-evaluating module 270 finds that the correlation value does not meet the threshold, the image-evaluating module 270 selects another first MTF curve figured out from another First Speckle-Pattern Image or selects another second MTF curve figured out from another Second Speckle-Pattern Image (step 370). After a new first MTF curve or second MTF curve is selected, the correlation value between the first MTF curve and the second MTF curve is figured out again (step 350). This calculation cycle is run repeatedly until a correlation value between the first MTF curve and the second MTF curve meets (higher than or equal to) the threshold (step 360). Therein, as shown in FIG. 3A, it is checked whether a new First Speckle-Pattern Image is required. If not required, the modulation transfer module 250 figures out another second MTF curve based on another Second Speckle-Pattern Image (step 376,320b) for figuring a correlation value between the first MTF curve and the new second MTF curve (step 350). If required, the modulation transfer module 250 figures out another first MTF curve based on another First Speckle-Pattern Image (step 378,320a) for figuring out a correlation value between the new first MTF curve and the second MTF curve (step 350).

When the image-evaluating module 270 finds the figured-out correlation value meets the threshold (step 360), evaluation of the correlation value between the first MTF curve of the First Speckle-Pattern Image and the second MTF curve of the Second Speckle-Pattern Image is finished. In another word, a process of digital image correlation uses the First Speckle-Pattern Image and the Second Speckle-Pattern Image to obtain a good solution. Thus, correlation between the First Speckle-Pattern Image and the Second Speckle-Pattern Image is analyzed for obtaining physical parameters of the target object, like moving field and stress field.

Figure 4:
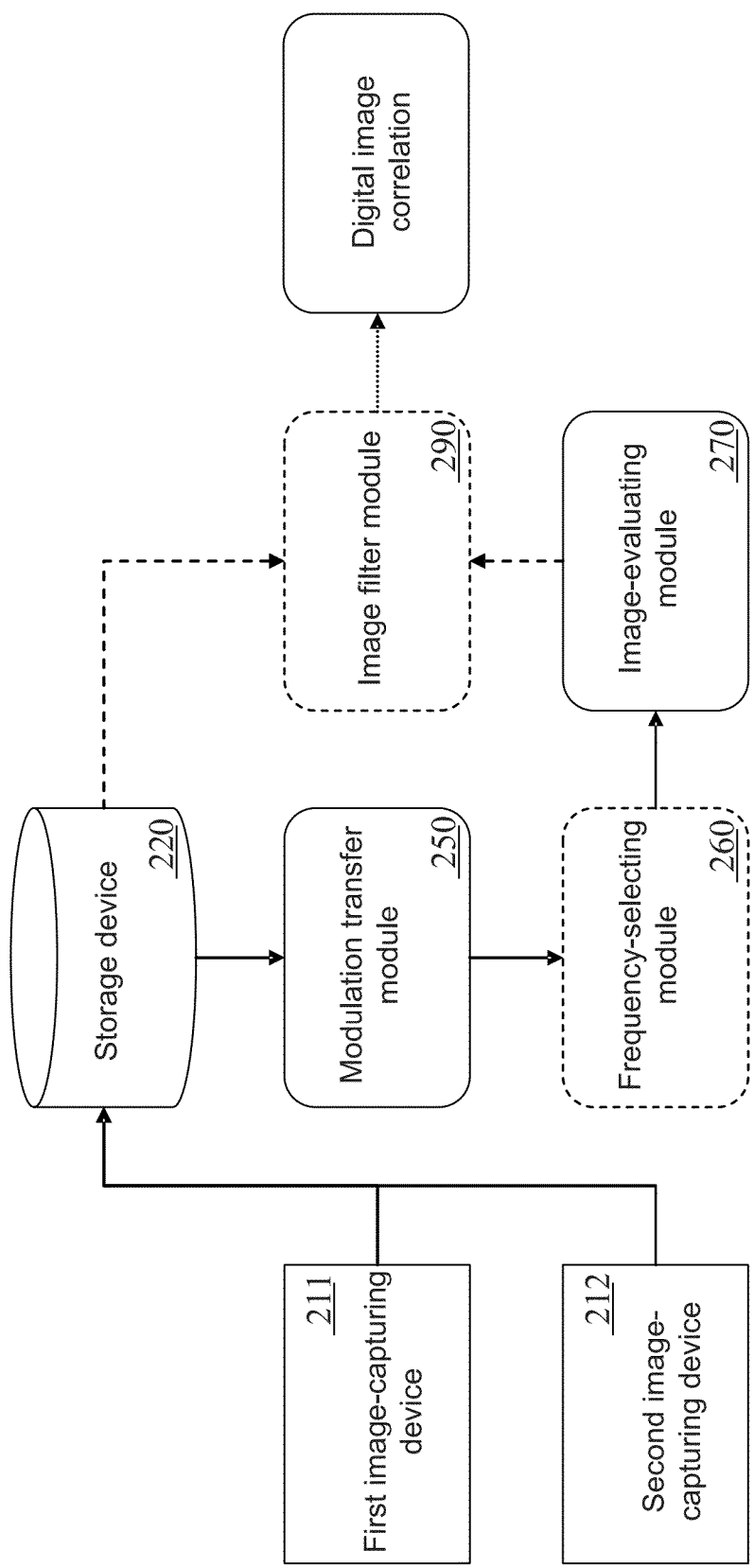
FIG. 4 is the structural view showing the second apparatus for the present invention.

In FIG. 4, an apparatus for the present invention comprises a first image-capturing device 211, a second image-capturing device 212, a storage device 220, a modulation transfer module 250 and an image-evaluating module 270, where the apparatus can further comprises a frequency-selecting module 260 and an image filter module 290

The first image-capturing device 211 and the second image-capturing device 212 capture images having the target object shown within, where the image-capturing device 210 is a digital camera or a pickup camera. Therein, the first image-capturing device 211 and the second image-capturing device 212 are placed in different places. Thus, the first image-capturing device 211 and the second image-capturing device 212 capture images of the target object from different angles and different distances.

The second image-capturing device 212 captures a Second Speckle-Pattern Image of the target object when the image-evaluating module 270 finds that the correlation value figured out does not meet the threshold.

Figure 5:
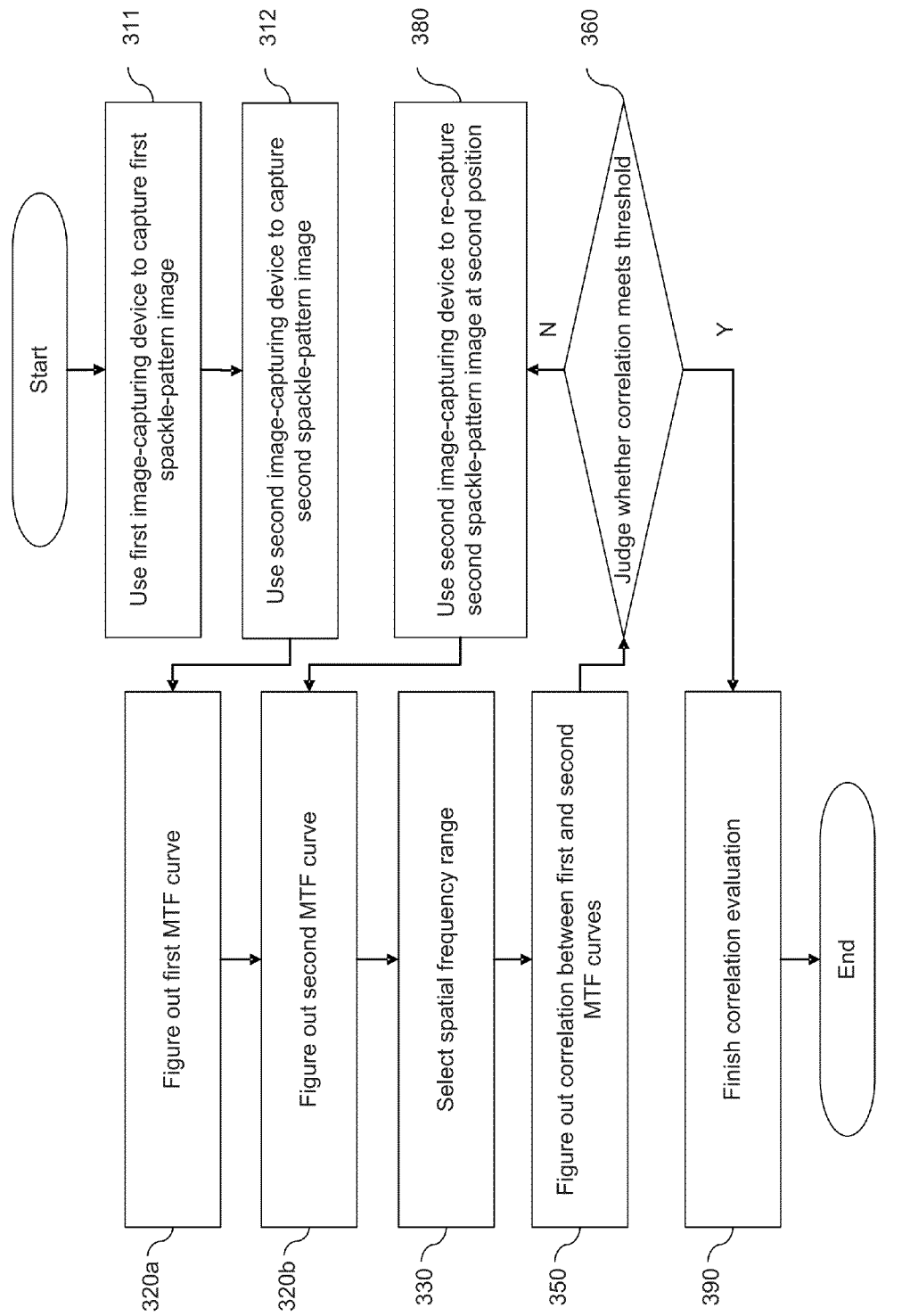
FIG. 5 is the structural view showing the third apparatus for the present invention.

In FIG. 5, at first, when the target object is positioned at a first place, the first image-capturing device 211 captures a First Speckle-Pattern Image of the target object (step 311) to be stored in the storage device 220. Then, when the target object is positioned at a second place, a Second Speckle-Pattern Image of the target object is captured (step 312) to be stored in the storage device 220. After the first image-capturing device 211 captures the First Speckle-Pattern Image of the target object at an exactly focusing position, the target object may acts, moves or deforms to move to a blurring position nearer or farer to the image-capturing device 210.

After the first image-capturing device 211 captures the First Speckle-Pattern Image and the Second Speckle-Pattern Image (step 311,312), the modulation transfer module 250 figures out a first MTF curve base on the First Speckle-Pattern Image (step 320a) and a second MTF curve base on the Second Speckle-Pattern Image (step 320b). Then, the image-evaluating module 270 directly figures out a correlation value between the first MTF curve and the second MTF curve (step 340) and judges whether the correlation value meets a threshold (step 350). After the target object acts, moves or deforms, the target object changes its position to the blurring position where the first image-capturing device 211 captures a very blurring Second Speckle-Pattern Image and the image-evaluating module 270 finds that the correlation value does not meet (smaller than) the threshold.

When the image-evaluating module 270 finds the correlation value does not meet the threshold, the second image-capturing device 212 captures an image of the target object at the second place as a Second Speckle-Pattern Image (step 380). The second image-capturing device 212 is positioned at a place whose exactly focusing position is different from the exactly focusing position of the first image-capturing device 211. Thus, when the target object changes its position to the blurring position of the first image-capturing device 211, the second image-capturing device 212 captures the exactly focusing Second Speckle-Pattern Image.

Thus, the modulation transfer module 250 figures out a second MTF curve of the Second Speckle-Pattern Image re-captured by the second image-capturing device 212 (step 320b). The image-evaluating module 270 figures out a correlation value of the first MTF curve and the new second MTF curve (step 350). After figuring out the correlation value, it is checked that whether the correlation value meets the threshold (step 360).

After the image-evaluating module 270 finds the correlation value meets the threshold, the evaluation of the correlation value between the First Speckle-Pattern Image and the Second Speckle-Pattern Image is finished (step 390). Thus, the First Speckle-Pattern Image and the Second Speckle-Pattern Image are processed through analysis of digital image correlation to obtain physical parameters like displacement field and stress field of the target object.

The present invention can further comprise a frequency-selecting module 260. After the frequency-selecting module 260 selects a spatial frequency range according to the first MTF curve (step 330), the image-evaluating module 270 figures out the correlation value between the first MTF curve second MTF curve within the spatial frequency range selected by the frequency-selecting module 260.

To sum up, the present invention is a method of evaluating image correlation with speckle pattern, where a First Speckle-Pattern Image and a Second Speckle-Pattern Image of a target object are captured at different times; after respectively figuring out a first MTF curve and a second MTF curve based on the First Speckle-Pattern Image and the Second Speckle-Pattern Image, a correlation value between the first MTF curve and the second MTF curve is figured out for checking whether the correlation value meets a threshold; if not, a correlation value between a new first MTF curve and the second MTF curve or between the first MTF curve and a new second MTF curve is figured out again; if yes, evaluation of correlation between the First Speckle-Pattern Image and the Second Speckle-Pattern Image is finished; error of strain and displacement for digital image correlation owing to blurring images of the on-moving target object is figured out; and, thus, calculation time of the digital image correlation is reduced and accuracy on measuring physical parameters of the target object before and after movement is improved for digital image correlation.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of evaluating image correlation with speckle pattern, comprising steps of:
    (a) using a first image-capturing device to capture a First Speckle-Pattern Image and at least one Second Speckle-Pattern Image of a target object at different times, separately;
    (b) obtaining a first modulation transfer function (MTF) curve of said First Speckle-Pattern Image and obtaining at least one second MTF curve of said at least one Second Speckle-Pattern Image;
    (c) obtaining a correlation value between said first MTF curve and said at least one second MTF curve; and
    (d) finishing evaluating said correlation value between said first MTF curve and said at least one second MTF curve when said correlation value meets a threshold.

2. The method according to claim 1, wherein step (b) further comprises steps of:
    (b1) transforming said First Speckle-Pattern Image and said at least one Second Speckle-Pattern Image into a first 2-dimensional (2D) matrix and at least one second 2D matrix, respectively;
    (b2) obtaining a first average value and at least one second average value of said first 2D matrix and said at least one second 2D matrix, respectively, and deducting each element of said first 2D matrix and each element of said at least one second 2D matrix with said first average value and said at least one second average value, respectively;
    (b3) processing Fourier transformation to said first 2D matrix and said at least one second 2D matrix to obtain a first gray-scaled image and at least one second gray-scaled image, respectively; and
    (b4) analyzing said first gray-scaled image and said at least one second gray-scaled image to obtain a first MTF curve and at least one second MTF curve.

3. The method according to claim 1, wherein, step (c) further comprises steps of:
    (c1) selecting a spatial frequency range according to said first MTF curve; and
    (c2) obtaining said correlation value according to said spatial frequency range.

4. The method according to claim 1, wherein, when said correlation value does not meets said threshold, step (d) further comprises steps of:
    (d1) selecting another First Speckle-Pattern Image to obtain another first MTF curve; and
    (d2) re-obtaining said correlation value with said another first MTF curve and said second MTF curve.

5. The method according to claim 1, wherein, when said correlation value does not meets said threshold, step (d) further comprises steps of:
    (d1) selecting another Second Speckle-Pattern Image to obtain another second MTF curve; and
    (d2) re-obtaining said correlation value with said first MTF curve and said another second MTF curve.

6. The method according to claim 1, wherein, step (a) further comprises steps of:
    (a1) using the first image-capturing device to capture said First Speckle-Pattern Image of said target object when said target object is positioned at a first place; and
    (a2) using the first image-capturing device to capture said at least one Second Speckle-Pattern Image of said target object when said target object is positioned at a second place.

7. The method according to claim 6, wherein, step (d) further comprises steps of:
    (d1) when said correlation value does not meet said threshold, using at least one second image-capturing device to capture said at least another Second Speckle-Pattern Image of said target object at said second place; and
    (d2) using each of said at least another Second Speckle-Pattern Image to obtain another second MTF curve and re-obtaining said correlation value with said first MTF curve and said another second MTF curve until said correlation value meets said threshold.

8. A system of evaluating image correlation with speckle pattern, comprising:
    an image-capturing device, which captures a First Speckle-Pattern Image and at least one Second Speckle-Pattern Image of a target object at different times, separately;
    a modulation transfer module, which obtains a first modulation transfer function (MTF) curve of said First Speckle-Pattern Image and at least one second MTF curve of said at least one Second Speckle-Pattern Image; and
    an image-evaluating module, which obtains a correlation value between said first MTF curve and said second MTF curve, and finishes obtaining said correlation value when said correlation value meets a threshold.

9. The system according to claim 8, wherein, said image-evaluating module further transforms said First Speckle-Pattern Image into a first 2-dimensional (2D) matrix and transforms said at least one Second Speckle-Pattern Image into at least one second 2D matrix, obtains a first average value of said first 2D matrix and at least one second average value of said at least one second 2D matrix, deducts each element of said first 2D matrix with said first average value and each element of said at least one second 2D matrix with said at least one second average value, respectively, processes Fourier transformation to said first 2D matrix to obtain a first gray-scaled image and said at least one second 2D matrix to obtain at least one second gray-scaled image, and analyzes said first gray-scaled image to obtain a first MTF curve and said at least one second gray-scaled image to obtain at least one second MTF curve.

10. The system according to claim 8, further comprises a frequency-selecting module, which selects a spatial frequency range according to said first MTF curve for said image-evaluating module obtains said correlation value according to said spatial frequency range.

11. The system according to claim 8, further comprises an image filter module, which filters noise in said First Speckle-Pattern Image and said at least one Second Speckle-Pattern Image and/or improves quality of said First Speckle-Pattern Image and said at least one Second Speckle-Pattern Image.

12. The system according to claim 8, wherein, said image-evaluating module further selects another First Speckle-Pattern Image to obtain another first MTF curve when said correlation value does not meet said threshold and re-obtains said correlation value with said another first MTF curve and said second MTF curve.

13. The system according to claim 8, wherein, said image-evaluating module further selects another Second Speckle-Pattern Image to obtain another second MTF curve and re-obtains said correlation value with said first MTF curve and said another second MTF curve when said correlation value does not meet said threshold.

14. A system of evaluating image correlation with speckle pattern, comprising:
   a first image-capturing device, which captures a First Speckle-Pattern Image of a target object when said target object is positioned at a first place, and captures a Second Speckle-Pattern Image of said target object when said target object is positioned at a second place;
   a modulation transfer module, which obtains a first modulation transfer function (MTF) curve of said First Speckle-Pattern Image and a second MTF curve of said Second Speckle-Pattern Image;
   an image-evaluating module, which obtains a correlation value between said first MTF curve and said at least one second MTF curve, and finishes obtaining said correlation value when determining said correlation value meets a threshold; and
   a second image-capturing device, which captures at least another Second Speckle-Pattern Image of said target object at said second location for said modulation transfer module using said each of at least another Second Speckle-Pattern Image to obtain another second MTF curve and said image-evaluating module re-obtaining said correlation value with said first MTF curve and said another second MTF curve until said correlation value meets said threshold.

15. The system according to claim 14, wherein, said image-evaluating module further transforms said First Speckle-Pattern Image into a first 2-dimensional (2D) matrix and transforms said at least one Second Speckle-Pattern Image into at least one second 2D matrix, obtains a first average value of said first 2D matrix and at least one second average value of said at least one second 2D matrix, deducts each element of said first 2D matrix with said first average value and each element of said at least one second 2D matrix with said at least one second average value, respectively, processes Fourier transformation to said first 2D matrix to obtain a first gray-scaled image and said at least one second 2D matrix to obtain at least one second gray-scaled image, and analyzes said first gray-scaled image to obtain a first MTF curve and said at least one second gray-scaled image to obtain at least one second MTF curve.

16. The system according to claim 14, further comprises a frequency-selecting module, which selects a spatial frequency range according to said first MTF curve for said image-evaluating module obtains said correlation value according to said spatial frequency range.

17. The system according to claim 14, further comprises an image filter module, which filters noise in said First Speckle-Pattern Image and said at least one Second Speckle-Pattern Image and/or improves quality of said First Speckle-Pattern Image and said at least one Second Speckle-Pattern Image.

* * * * *